United States Patent
Kim et al.

(10) Patent No.: US 9,940,538 B2
(45) Date of Patent: *Apr. 10, 2018

(54) VISUAL COMPARISONS USING PERSONAL OBJECTS

(71) Applicant: International Business Machines Corporation, Armonk, NY (US)

(72) Inventors: Minkyong Kim, Scarsdale, NY (US); Min Li, San Jose, CA (US); Clifford A. Pickover, Yorktown Heights, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,422

(22) Filed: May 5, 2017

(65) Prior Publication Data
US 2017/0236025 A1    Aug. 17, 2017

Related U.S. Application Data

(63) Continuation of application No. 14/964,814, filed on Dec. 10, 2015, which is a continuation of application
(Continued)

(51) Int. Cl.
*G06K 9/46* (2006.01)
*G06Q 30/00* (2012.01)
(Continued)

(52) U.S. Cl.
CPC ..... *G06K 9/4609* (2013.01); *G06F 17/30259* (2013.01); *G06F 17/30274* (2013.01);
(Continued)

(58) Field of Classification Search
CPC .............. G06Q 30/0643; G06Q 30/02; G06Q 30/0601; G06Q 30/06; G06Q 30/0641; G06Q 30/0629; G06K 9/6202; G06K 9/46
(Continued)

(56) References Cited

U.S. PATENT DOCUMENTS

| | | | |
|---|---|---|---|
| 6,912,293 B1 * | 6/2005 | Korobkin | G06T 17/10 345/420 |
| 7,130,821 B1 | 10/2006 | Connors et al. | |

(Continued)

FOREIGN PATENT DOCUMENTS

WO    2004066209 A1    8/2004

OTHER PUBLICATIONS

Subramanian et al.; "Size constancy in visual impairment: a comparison with normally sighted individuals"; Ophthalmic and Physiological Optics; Jul. 2004; p. 1; vol. 24, Issue 4; <http://www.ncbi.nlm.nih.gov/pubmed/15228514>.
(Continued)

*Primary Examiner* — Sheela C Chawan
(74) *Attorney, Agent, or Firm* — Alexa L. Ashworth; Brian M. Restauro

(57) ABSTRACT

Embodiments of the present invention provide automated systems and methods for visualizing a product using standard and personal objects. An image can be retrieved from the shopping history or shopping cart of a user, and the dimensions of the image can be automatically adjusted to make an accurate relative size comparison to a product for purchase.

1 Claim, 5 Drawing Sheets

Related U.S. Application Data

No. 14/735,204, filed on Jun. 10, 2015, now Pat. No. 9,563,819.

(51) Int. Cl.

| | | |
|---|---|---|
| *G06Q 30/06* | (2012.01) | |
| *G06F 17/30* | (2006.01) | |
| *G06K 9/52* | (2006.01) | |
| *G06T 7/62* | (2017.01) | |
| *G06K 9/62* | (2006.01) | |
| *H04L 29/08* | (2006.01) | |

(52) U.S. Cl.
CPC .............. *G06K 9/52* (2013.01); *G06K 9/6203* (2013.01); *G06K 9/6215* (2013.01); *G06Q 30/0629* (2013.01); *G06Q 30/0641* (2013.01); *G06T 7/62* (2017.01); *H04L 67/02* (2013.01)

(58) Field of Classification Search
USPC ................ 382/100, 164, 190; 705/26.1, 27.2
See application file for complete search history.

(56) References Cited

U.S. PATENT DOCUMENTS

| | | | |
|---|---|---|---|
| 7,702,185 B2 | 4/2010 | Keating et al. | |
| 7,737,991 B2 | 6/2010 | McClanahan | |
| 7,937,391 B2 | 5/2011 | Chea et al. | |
| 7,970,655 B2 | 6/2011 | Schwab | |
| 8,189,855 B2 * | 5/2012 | Opalach | G06K 9/00 382/100 |
| 8,250,492 B2 | 8/2012 | Kondaks | |
| 8,630,924 B2 * | 1/2014 | Groenevelt | G06Q 10/087 211/90.01 |
| 8,923,551 B1 * | 12/2014 | Grosz | H04N 1/00145 382/100 |
| 9,036,862 B2 * | 5/2015 | Boncyk | G06F 17/30247 382/100 |
| 9,082,148 B1 | 7/2015 | Oczkowski et al. | |
| 9,251,170 B2 | 2/2016 | Moore et al. | |
| 9,563,819 B2 | 2/2017 | Kim et al. | |
| 2003/0033219 A1 | 2/2003 | Kasahara et al. | |
| 2003/0156126 A1 | 8/2003 | Tsuji | |
| 2003/0236696 A1 | 12/2003 | Fabricant et al. | |
| 2011/0055054 A1 * | 3/2011 | Glasson | G06Q 30/06 705/27.2 |
| 2012/0290577 A1 | 11/2012 | Cai et al. | |
| 2013/0083996 A1 | 4/2013 | Prasad et al. | |
| 2013/0104063 A1 | 4/2013 | Legris | |
| 2013/0215116 A1 * | 8/2013 | Siddique | G06Q 30/0643 345/420 |
| 2014/0320317 A1 * | 10/2014 | Grauer | G08G 1/096716 340/907 |
| 2015/0317836 A1 | 11/2015 | Beaurepaire et al. | |
| 2016/0364779 A1 | 12/2016 | Kim et al. | |

OTHER PUBLICATIONS

List of IBM Patents or Patent Applications Treated as Related, filed herewith, 2 pages.

Kim et al., "Visual Comparisons Using Personal Objects", U.S. Appl. No. 15/587,434, filed May 5, 2017, 17 pages.

* cited by examiner

VISUAL COMPARISONS USING PERSONAL OBJECTS

BACKGROUND OF THE INVENTION

The present invention relates generally to the field of visual object comparisons, and more particularly to retrieving one or more objects of personal interest to a user and using the object(s) to automatically make contextual visual comparisons to a product image.

It is known that users can view objects on a computer over the Internet, including products for purchase. Often, dimensions, such as a height, width, depth, and color are provided for these products, but it may be difficult to have an intuitive idea of the real-world size of the products to be purchased from an online product website.

SUMMARY

According to one embodiment of the present invention, a method for visual image comparison is provided, the method comprising: receiving, by one or more processors, a request for a visual comparison to a first image of an item displayed in a Web-based portal of a requester; responsive to receiving the request for the visual comparison to the first image, retrieving, by one or more processors, a second image of a previously featured item, wherein the second image is related to the first image; generating, by one or more processors, a set of dimensional properties of the second image, based on the first image; and displaying, by one or more processors, the second image and the first image for the visual comparison, wherein the generated set of dimensional properties of the second image represent a relative size of the first image to the second image.

Another embodiment of the present invention provides a computer program product for visual image comparison, based on the method described above.

Another embodiment of the present invention provides a computer system for visual image comparison, based on the method described above.

DETAILED DESCRIPTION

Embodiments of the present invention provide systems and methods for an automated means for an automated contextual visualization using standardized objects or personal objects retrieved from a shopping history or shopping cart of a user.

Figure 1:
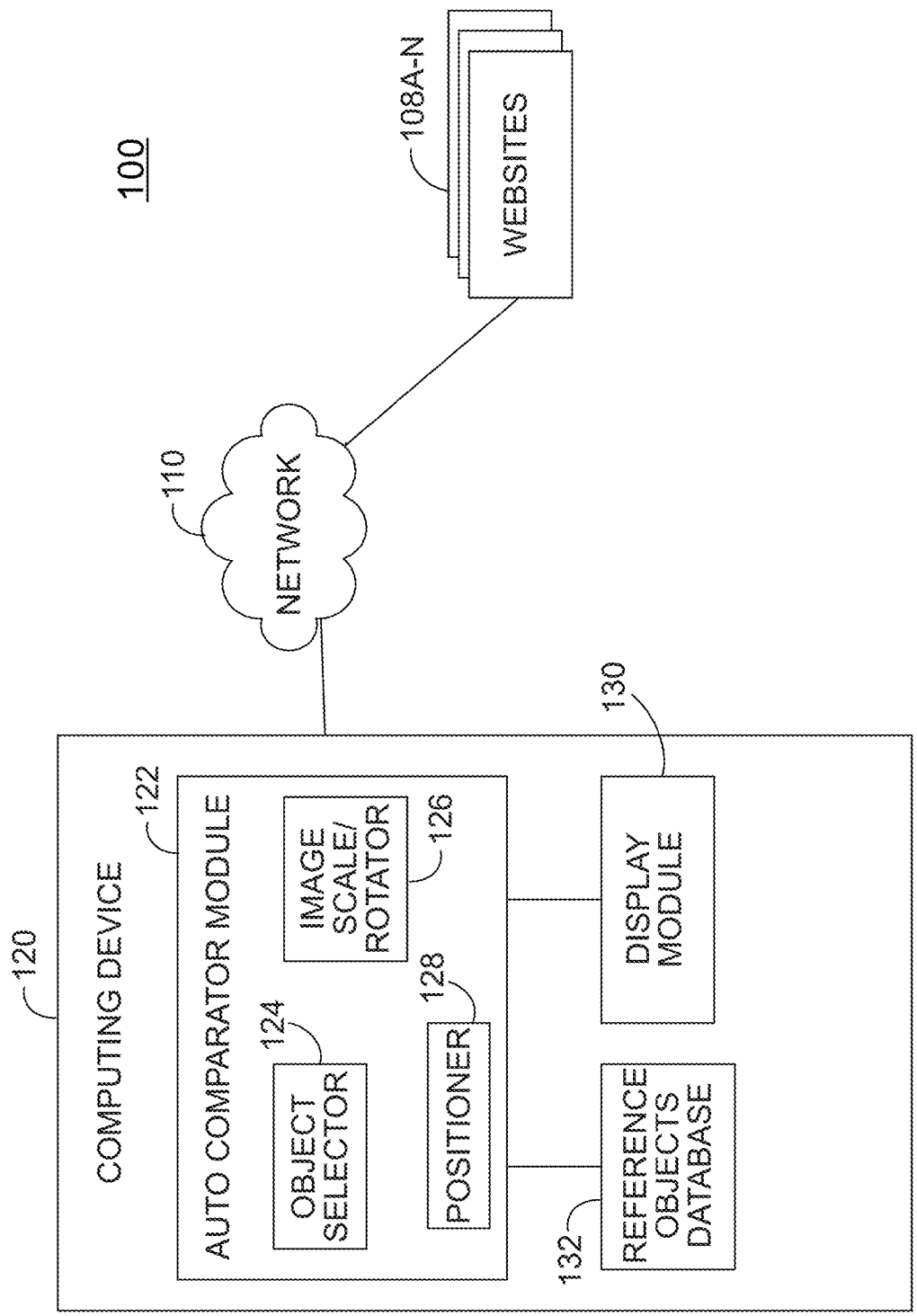
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. Modifications to distributed data processing environment 100 may be made by those skilled in the art without departing from the scope of the invention as recited by the claims. In an exemplary embodiment, distributed data processing environment 100 includes computing device 120 and websites 108A-N, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication and/or access between computing device 120 and websites 108A-N.

Websites 108A-N include one or more websites which can be accessed by auto comparator module 122 for comparing a product to objects of personal interest to a user. Websites 108A-N may include, for example, photo-sharing websites, online shopping websites, and social media websites. User information, such as products currently in a user's shopping cart, past viewed, and/or purchased products, may be stored on websites 108A-N. In this exemplary embodiment, auto comparator module 122 is integrated with each of websites 108A-N, so that a user may make product comparisons based on the products at each of websites 108A-N.

Computing device 120 includes auto comparator module 122, reference objects database 132, and display module 130. In various embodiments of the present invention, computing device 120 can be a laptop computer, a tablet computer, a netbook computer, a personal computer (PC), a desktop computer, a personal digital assistant (PDA), a smart phone, a thin client, or any programmable electronic device capable of executing computer readable program instructions. Computing device 120 may include internal and external hardware components, as depicted and described in further detail with respect to FIG. 4.

Reference objects database 132 stores a standardized collection of objects with a relative cultural and cognitive recognition to a user. For example, reference objects may include an image of a dollar bill, an image of a human of a particular height and size, and an image of a tablet device or smart phone of a known size. Reference objects database 132 may be modified to include objects which have a cultural significance to the user. For example, in the United States, an image of a dollar may be stored, whereas in Europe, an image of a euro may be stored. In this exemplary embodiment, reference objects database 132 is stored locally on computing device 120. In other embodiments, reference objects database 132 may be stored remotely, such as on a server, and accessed and/or downloaded by computing device 120.

Display module 130 communicates with auto comparator module 122, to invoke various object comparisons when a user views a product on one or more of websites 108A-N. Display module 130 can include a graphical user interface (GUI) (not depicted in FIG. 1), which allows a user to move, scale, and/or reposition a retrieved image near a product or offering, to make a contextual visual comparison. In some embodiments, display module 130 can be integrated with auto comparator module 122.

In this exemplary embodiment, auto comparator module 122 includes object selector 124, image scale and rotator 126, and positioner 128. Auto comparator module 122 can communicate with reference objects database 132 and can communication with websites 108A-N via network 110.

Object selector 124 chooses one or more objects or environments for a product comparison. In this exemplary embodiment, object selector 124 selects objects or environments which have a contextual relevance to a user. Object selector 124 determines which objects or environments may have a contextual relevance to a user by factoring the following criteria: the familiarity of the object or environment to the user (e.g., a room in the user's house or the cellphone of a user), the size, color, and/or volume of the object or environment is comparable to the product, and the usage scenarios between the product and object or environment (e.g., comparison between the size of a pan contemplated for purchase and a user's stovetop). Additionally, object selector 124 may determine one or more contextually relevant images using information from websites to which a user has uploaded content, viewed content, and/or purchased products. In this exemplary embodiment, object selector 124 automatically selects a relevant image to make a contextual comparison to a product.

Image scale and rotator 126 allows the scaling of a comparison image in a meaningful way to a target image (i.e., a product for purchase). Image scale and rotator 126 may use provided product dimensions and/or may mine metadata from product manuals or other sources to determine a meaningful relative comparison, and may access reference objects database 132. For example, a user viewing a product, such as a television, may drag the image of the television to an image of the user's living room, and image scale and rotator 126 automatically resizes the image of the television to the scale of the image of the user's living room, so that the user may visualize how the real-world size of the television fits within the dimensions of the user's living room.

Positioner 128 determines how to place the selected relevant image near a viewed product. For example, if the selected image and product are similar (e.g., both the image and product are purses), positioner 128 may automatically place them side by side or adjacent to each other. In some embodiments, positioner 128 allows a user to drag a selected image and place it anywhere near, or overlapping with, a product (e.g., place an image of a couch over a picture of a user's living room).

In other embodiments, a predictor module may be included within auto comparator module 122. The predictor module may calculate size change predictions, and perform automatic notifications to a user. For example, the predictor module may estimate the size of the feet of a growing child, based on statistical data of the growth of feet, and notify a user when a larger shoe size may be needed.

Figure 2:
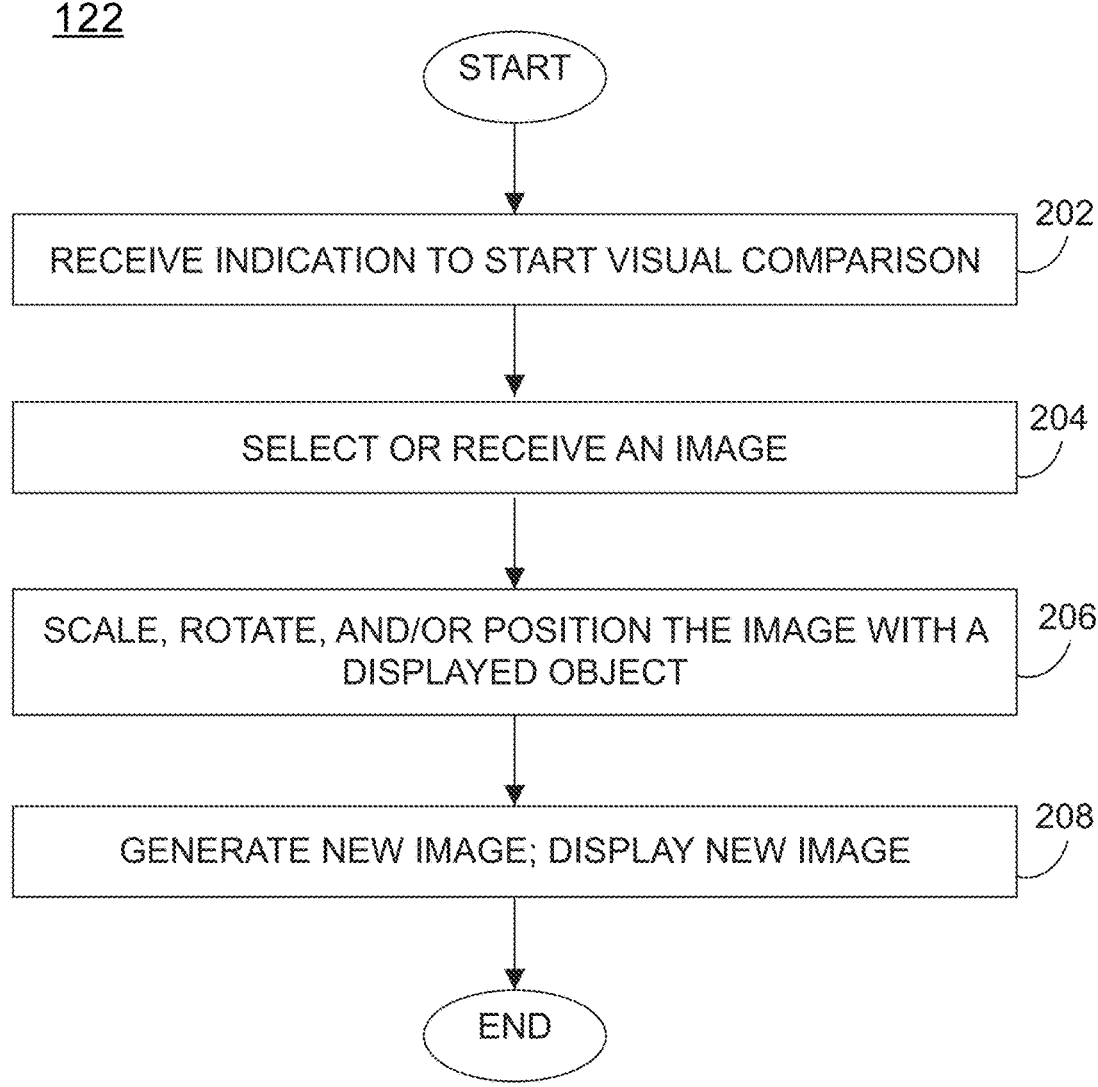
FIG. 2 is a flowchart illustrating operational steps for automatically visualizing a product, by comparison to standardized objects or personal objects, in accordance with an embodiment of the present invention.

FIG. 2 is a flowchart illustrating operational steps for automatically visualizing a product, by comparison to standardized objects or personal objects, in accordance with an embodiment of the present invention.

In step 202, auto comparator module 122 receives an indication to start a visual comparison. In this exemplary embodiment, auto comparator module 122 receives a selection from a user to start a visual comparison for a product displayed on the user's Web-based shopping portal. For example, a user may click on an integrated link within a shopping website, indicating to initiate auto comparator module 122. In other embodiments, auto comparator module 122 is initiated automatically responsive to a user gesture, such as selecting a product to view on a website.

In step 204, auto comparator module 122 selects or receives an image. In this exemplary embodiment, auto comparator module 122 receives a selected image from the user's Web-based shopping portal, for a product comparison. For example, auto comparator module 122 may receive a selected image of a product for purchase. In some embodiments, a user uploads an image of themselves and provides dimension (e.g., height) information. In other embodiments, auto comparator module 122 (i.e., object selector 124) automatically retrieves an image from such places as a user's current shopping cart, a user's personal shopping history, a user's account on a photo sharing website, or the shopping history of a friend or family member of the user (with the friend or family member's authorization). These websites and Web-based shopping portals are often familiar to users.

In step 206, auto comparator module 122 scales, rotates, and/or positions the image with a displayed object. In this exemplary embodiment, auto comparator module 122 automatically adjusts the image of a product for a comparison and/or a retrieved image using image scale and rotator 126 and/or positioner 128.

In step 208, auto comparator module 122 generates a new image and displays the new image. In this exemplary embodiment, auto comparator module 122 generates a new image, which includes the adjusted image of the selected personal or standard object(s) for comparison and the adjusted image of the product. The images are displayed together as a new image, after the scaling and/or repositioning of the images.

Figure 3A:
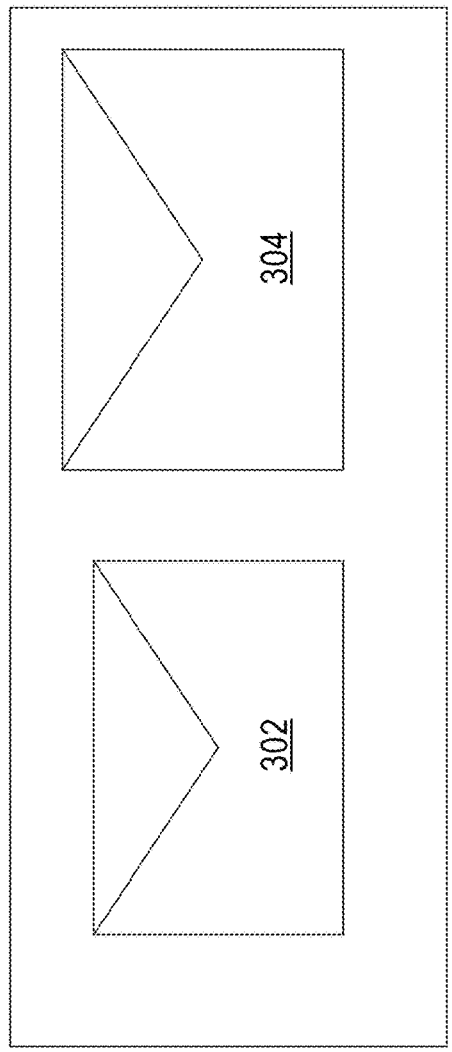
FIGS. 3A and 3B depict an example of a visualization of an object using personal objects and standardized objects, respectively, in accordance with an embodiment of the present invention.
Figure 3B:
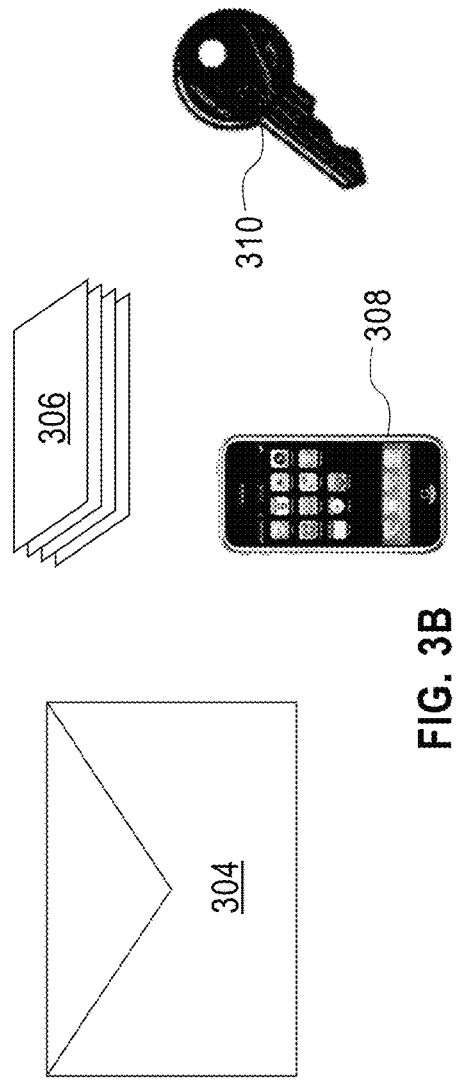

FIGS. 3A and 3B depict an example of a visualization of an object using personal objects and standardized objects, respectively, in accordance with an embodiment of the present invention.

FIG. 3A depicts wallet 304, which is an image a user is viewing for a contemplated purchase. The user, for example, wants to purchase a new wallet, which is at least large enough to fit the user's smart phone, keys, and money, from a shopping website. In this example, auto comparator module 122 automatically retrieves an image of wallet 302, which is in the user's shopping history, as the user purchased wallet 302 one year ago (and which is able to fit the user's smart phone, keys, and wallet) and scales the image of wallet 302 to make a comparison with the size of wallet 304. The user is able to readily identify that wallet 304 is larger than wallet 302 (an item which the user has personally used), and is able to fit the user's items.

FIG. 3B depicts another embodiment of auto comparator module 122. In this example, wallet 304 is an image a user is viewing for a contemplated purchase. As in FIG. 3A, the user, for example, wants to purchase a new wallet from a shopping website which is at least large enough to fit the user's smart phone, keys, and money. In this embodiment, auto comparator module 122 accesses reference objects database 132 and selects, and automatically scales, standardized objects of money 306, smart phone 308, and key 310, for the user to make a visual comparison. The user is able to readily identify whether the standardized objects (which represent the user's real-world possessions) will fit into wallet 304 (the contemplated product for purchase).

Figure 3C:
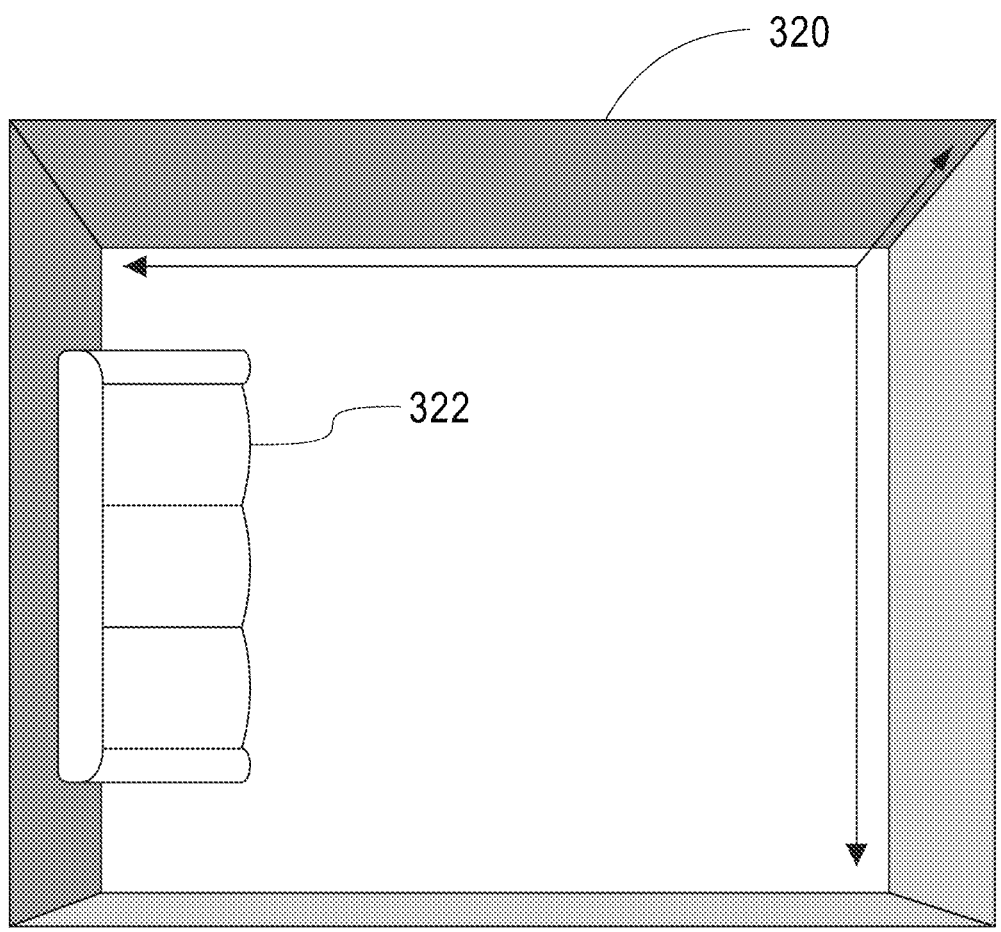
FIG. 3C is an example of a visualization of an environment using standardized and personal objects, in accordance with an embodiment of the present invention.

FIG. 3C is an example of a visualization of an environment using standardized and personal objects, in accordance with an embodiment of the present invention.

FIG. 3C depicts an image of environment 320 (e.g., a user's living room) and an image of object 322 (e.g., a couch), which the user is contemplating purchasing. The image of environment 320 has the correctly scaled dimensions (i.e., height, width, and depth) of the user's living room, and the real-world dimensions associated with object 322 are also known. Auto comparator module 122 can scale and position the image of object 322 to fit the image of the user's living room (i.e., environment 320), so that the user is able to visualize how object 322 will fit (and if it will fit) in the user's living room, before purchasing object 322.

Figure 4:
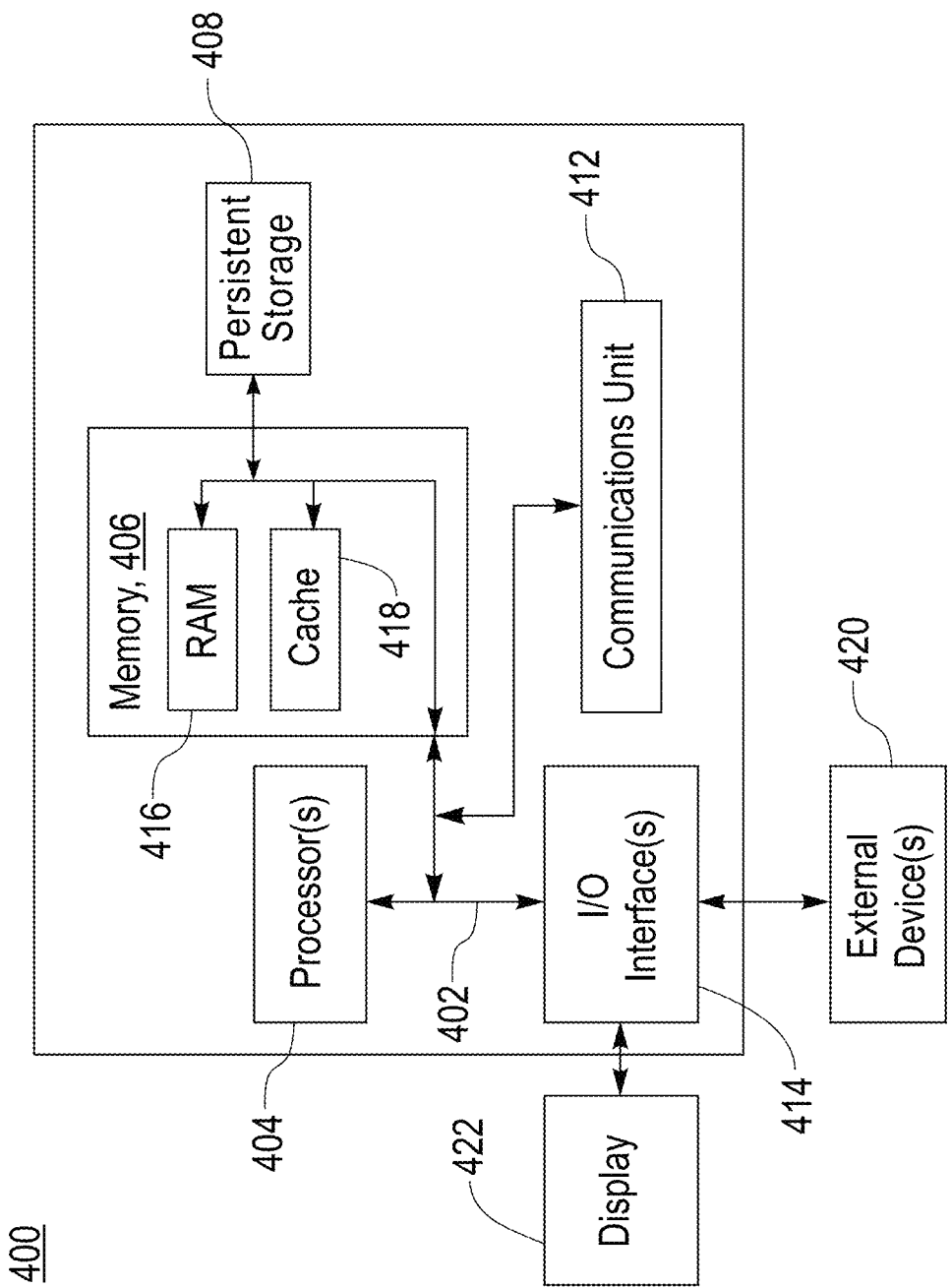
FIG. 4 is a block diagram of internal and external components of the computing device of FIG. 1, in accordance with an embodiment of the present invention.

FIG. 4 is a block diagram of internal and external components of a computing device 400, which is representative of the computing device of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 412 provides for communications with other computer systems or devices via a network (e.g., network 110). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computing device 400 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computing device 400. For example, I/O interface 414 can provide a connection to one or more external devices 420 such as a keyboard, computer mouse, touch screen, virtual keyboard, touch pad, pointing device, or other human interface devices. External devices 420 can also include portable computer readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for visual image comparison, comprising:
 a non-transitory computer readable storage medium and program instructions stored on the non-transitory computer readable storage medium, the program instructions comprising:
 program instructions to receive a request for a visual comparison to a first image of an item displayed in a Web-based shopping portal of a requester;
 responsive to receiving the request for the visual comparison to the first image, program instructions to retrieve automatically a second image of a previously featured item, wherein the second image:
  is determined to be contextually related to the first image based on a set of information from a website which the requester has uploaded content and purchased a product,
  comprises one or more images associated with an object previously purchased by the requester from a Web-based shopping history of the requester, and
  comprises a comparable size to the first image and a similar usage scenario to the first image;
 program instructions to retrieve a third image, wherein the third image comprises standard reference objects representative of a set of possessions of the requester, wherein the standard reference objects are images offered at the Web-based shopping portal of the requester;

program instructions to generate a set of dimensional properties of the second image, based on the first image, wherein:
- the set of dimensional properties of the second image comprise: a color, a size, an orientation, and a position on a display; and
- the set of dimensional properties of the second image are based in part on a determination made by an image scaler and an image rotator, which mines metadata from a product manual to determine the set of definitional properties of the second image relative to the first image;

program instructions to generate a predicted change in the set of dimensional properties of the second image at a future period of time; and program instructions to display the third image, the second image, and the first image for the visual comparison, wherein the generated set of dimensional properties of the second image represent a relative size of the first image to the second image, and the standard reference objects of the third image represent a relative size of the first image to the third image.

\* \* \* \* \*